US006873323B1

(12) United States Patent
Morein

(10) Patent No.: US 6,873,323 B1
(45) Date of Patent: Mar. 29, 2005

(54) VIDEO GRAPHICS SYSTEM THAT INCLUDES CUSTOM MEMORY AND SUPPORTS ANTI-ALIASING AND METHOD THEREFOR

(75) Inventor: Stephen L. Morein, Cambridge, MA (US)

(73) Assignee: ATI International, SRL (BB)

(*) Notice: Subject to any disclaimer, the term of this patent is extended or adjusted under 35 U.S.C. 154(b) by 426 days.

(21) Appl. No.: 09/630,816

(22) Filed: Aug. 2, 2000

(51) Int. Cl.[7] .................................................. G06T 1/00
(52) U.S. Cl. ...................................................... 345/418
(58) Field of Search .................................. 345/582, 419, 345/581, 421, 418, 426, 519–520, 501–506, 473, 631, 441, 611, 522, 530–574, 605, 531; 711/134, 133

(56) References Cited

U.S. PATENT DOCUMENTS 5,886,701 A * 3/1999 Chauvin et al. ............. 345/418
6,480,205 B1 * 11/2002 Greene et al. ............... 345/631

OTHER PUBLICATIONS

Schilling, A., "A New Simple and Efficient Antialiasing with Subpixel Masks", SIGGRAPH: Computer Graphics, ACM Press, NY, NY, 1991, pp. 133–141.*
Schilling, Andreas, "A New Simple and Efficient Antialiasing with Subpixel Masks," SIGGRAPH: Computer Graphics, ACM Press, Inc. NY,NY, 1991, pp 133–141.*
Greene, Ned, "Hierarchical Polygon Tiling with Coverage Masks", Proceedings of the 23 rd Annual Conference on Computer Graphics and Interactive Techniques, Aug., 1996, ACM Press, Inc. NY,NY, pp. 65–76.*
FBRAM: A New Form of Memory Optimized fo 3D Graphics.

* cited by examiner

Primary Examiner—Matthew C. Bella
Assistant Examiner—Dalip K. Singh
(74) Attorney, Agent, or Firm—Vedder, Price, Kaufman & Kammholz, P.C.

(57) ABSTRACT

A method and apparatus for supporting anti-aliasing oversampling in a video graphics system that utilizes a custom memory for storage of the frame buffer is presented. The custom memory includes a memory array that stores the frame buffer as well as a data path that performs at least a portion of the blending operations associated with pixel fragments generated by a graphics processor. The fragments produced by a graphics processor are oversampled fragments such that each fragment may include a plurality of samples. If the sample set for a particular pixel location can be compressed, the compressed sample set is stored within the frame buffer of the custom memory circuit. However, if such compression is not possible, pointer information is stored within the frame buffer on the custom memory, and a sample memory controller included on the graphics processor maintains a complete sample set for the pixel location within a sample memory. When the sample memory controller maintains a complete sample set for a pixel location, the frame buffer stores a pointer corresponding to the location of the sample set.

35 Claims, 5 Drawing Sheets

Frame Buffer Entry
140

Frame Buffer Entry
150

VIDEO GRAPHICS SYSTEM THAT INCLUDES CUSTOM MEMORY AND SUPPORTS ANTI-ALIASING AND METHOD THEREFOR

FIELD OF THE INVENTION

The invention relates generally to video graphics processing and more particularly to a method and apparatus for anti-aliasing support and a video graphics system that includes custom memory.

BACKGROUND OF THE INVENTION

Computers are used in many applications. As computer systems continue to evolve, the graphical display requirements of the systems become more demanding. This is especially true in applications where detailed graphical displays must be updated quickly. In many applications that utilize such detailed graphical displays, maintaining the detail of the display can consume large amounts of memory storage space and processing bandwidth.

Computer displays and other high resolution display devices present an image to a viewer as an array of individual picture elements, or pixels. The individual pixels are each given a specific color which corresponds to the color of the image of the location of the particular pixel. The pixels are closely spaced, and the viewer's visual system performs a filtering of the individual pixel colors to form a composite image. If the partitioning of the image into individual pixel elements is performed properly, and the pixels are close enough together, the viewer perceives the displayed array of pixels as a virtually continuous image. Despite the viewer's visual filtering, the viewer remains sensitive to aberrations in the image and video graphics systems must be designed to minimize these aberrations.

In many systems, graphical images for display are sampled and the image is regenerated based on the stored samples. Where the conservation of detail is important, oversampling is often utilized in order to avoid aliasing in the reconstructed graphical image. Oversampling techniques are well known in the art. In an oversampling system, multiple samples of each pixel are stored. Although each pixel is rendered using only a single color value, each of the samples for that particular pixel is used in generating the final color. In effect, a much more detailed, or higher resolution, version of the image is stored in memory, and this version is used to generate each of the colors for the pixels displayed on the screen.

Conventional oversampling in video graphic systems can require large amounts of memory. For example, if the system stores 8 samples for each pixel, and each sample includes 32 bits of color information and a 32-bit Z value, or the depth coordinate value, memory requirements for a high quality images which is 640×480 pixels is nearly 20 million bytes. The disadvantages of this amount of memory usage are apparent. First, the memory storage must be provided, which is costly. Second, the memory accesses required to store and improve the data can consume large amounts of bandwidth within the computing system.

The memory bandwidth issue can become especially troublesome when the bandwidth over a bus structure connecting a memory to a graphics processor is limited. In three-dimensional (3D) graphics processing, stored graphics data is often retrieved from memory and compared with newly generated pixel fragments to determine whether or not the fragments modify the state of the image as it is currently stored. If a determination is made that the fragment modifies the stored pixel information, the new value must be written back to the memory. As such, a large amount of bus bandwidth is required in order to perform both reading and writing operations associated with transferring video graphics data to and from the memory, which is often referred to as a frame buffer.

Therefore, a need exists for an anti-aliasing technique that makes efficient use of memory resources such that less memory space is required for storing the samples, and less bus bandwidth is required in order to perform the blending operations required in 3D graphics applications.

DETAILED DESCRIPTION

Generally, the present invention provides method and apparatus for supporting anti-aliasing oversampling in a video graphics system that utilizes a custom memory for storage of the frame buffer. The custom memory includes a memory array that stores the frame buffer as well as a data path that performs at least a portion of the blending operations associated with pixel fragments generated by a graphics processor. The fragments produced by a graphics processor are oversampled fragments such that each fragment may include a plurality of samples. If the sample set for a particular pixel location can be compressed, the compressed sample set is stored within the frame buffer of the custom memory circuit. However, if such compression is not possible, pointer information is stored within the frame buffer on the custom memory, and a sample memory controller included on the graphics processor maintains a complete sample set for the pixel location within a sample memory. When the sample memory controller maintains a complete sample set for a pixel location, the frame buffer stores a pointer corresponding to the location of the sample set.

Figure 1:
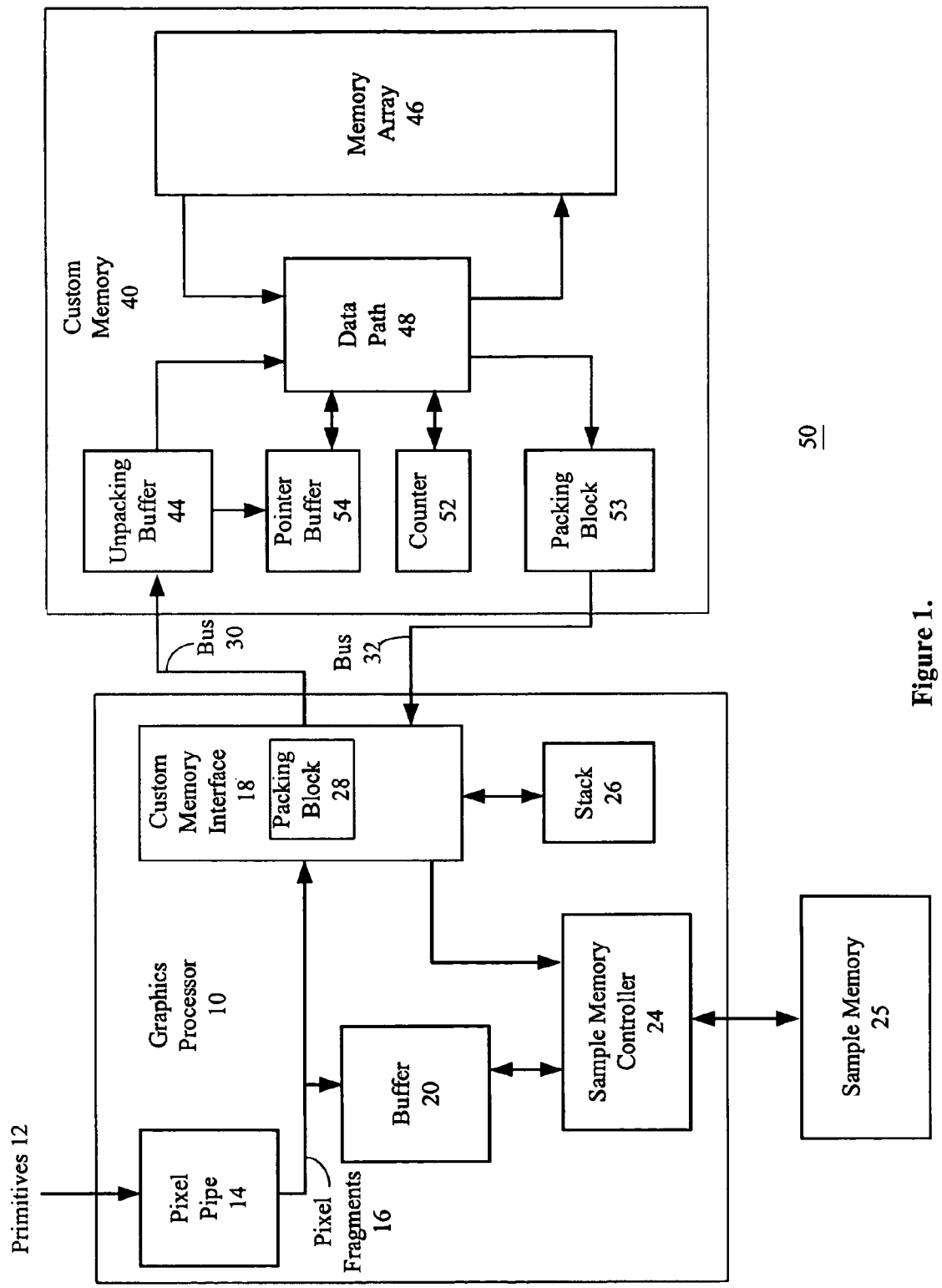
FIG. 1 illustrates a block diagram of a video graphics processing system in accordance with a particular embodiment of the present invention.

The invention can be better understood with reference to FIGS. 1–6. FIG. 1 illustrates a block diagram of a graphics processing system 50 that supports oversampling anti-aliasing. The system 50 includes a graphics processor 10, a sample memory 25, and a custom memory 40. The graphics processor 10, the custom memory 40, and the sample memory 25 may each be individual integrated circuits.

The graphics processor 10 includes a pixel pipe 14, a buffer 20, a custom memory interface 18, and a sample memory controller 24. The pixel pipe 14 of the graphics processor 10 receives video graphics primitives 12. The video graphics primitives 12 may be generated by a central processor in a computing system that includes the system 50. The pixel pipe 14 performs three-dimensional (3D) processing of the video graphics primitives 12 to produce pixel fragments 16. The 3D processing performed by the pixel pipe may include functions such as those performed by a raster engine, texture mapping blocks, and other graphics processing blocks commonly associated with 3D video graphics processing pipelines which are know in the art. The pixel fragments 16 produced by the pixel pipe 14 are oversampled pixel fragments, where each pixel fragment includes a color value, a Z value, and a coverage mask. The coverage mask indicates to which of the samples for the pixel fragment the color and Z values correspond. For example, the color and Z values may only correspond to the bottom most samples of the pixel fragment. As such, only half of the bits within the coverage mask will be set, where this encodes for which pixel fragments the color and Z values are valid.

Once generated, the pixel fragments 16 are stored within the buffer 20, which is operably coupled to the pixel pipe 14. Storage of the pixel fragment 16 within buffer 20 is performed such that the sample memory controller 24 can retrieve these pixel fragments for later use if necessary. In addition to storing the pixel fragments 16 within the buffer 20, the pixel fragments 16 are provided to the custom memory interface 18. The custom memory interface transmits the pixel fragments 16 to the custom memory 40 over the bus 30. Because the bandwidth available over the bus 30 may be limited due to the maximum bus speed with which the bus 30 can operate as well as the number of physical connectors provided on the bus 30, a packing block 28 may be included within the custom memory interface 18.

The packing block 28 may pack a number of pixel fragments together into a data block that can be transferred more efficiently over the bus 30 in a manner that maximizes the available bandwidth. Such packing techniques can include buffering a number of fragments that are to be processed simultaneously within the custom memory 40, where when enough fragments have been collected within a particular block, the block is packed and then transferred over the bus 30. Packing can be used to ensure that only valid fragment data is sent over the bus 30 with minimal inclusion of placeholders when necessary. As such, if a fragment block includes up to eight fragments, yet only three fragments are included in a block when it is to be transferred over the bus 30, the memory bandwidth utilized will only be that required to transfer the three fragments, and not the bandwidth required to send over a complete eight fragment block. Such packing techniques are described in additional detail in copending patent application Ser. No. 09/630,783 entitled "GRAPHICS PROCESSING SYSTEM WITH ENHANCED BUS BANDWIDTH UTILIZATION AND METHOD THEREFOR" which was filed on Aug. 2, 2000.

The custom memory 40 includes a memory array 46 and a data path 48. The memory array 46 may be a dynamic random access memory (DRAM) memory array. The memory array 46 stores a frame buffer corresponding to a display frame. The frame buffer includes an entry for each pixel location of the plurality of pixel locations of the display frame. Each entry of the frame buffer stores either a compressed sample set corresponding to the pixel location or a set of pointer information for the pixel location. Because DRAM memories typically allow a large amount of data to be read out simultaneously, the data path 48 may perform block processing operations, where the size of the block operated upon is dependent upon the width of the data word provided by the memory array 46. For example, if the memory array 46 is able to provide the data corresponding to eight pixel entries to the data path 48 simultaneously, the data path 48 may attempt to perform the processing for eight fragments simultaneously before writing the results back to the memory array 46. The block processing allows a large amount of parallelism, thus increasing the speed with which the overall system is capable of operating. Performing block processing operations within the data path 48 requires the pixel fragments sent across the bus 30 to be grouped into blocks for such processing. Preferably, this is performed within the graphics processor 10 prior to transference over the bus 30. However it may be possible to perform such grouping within an unpacking buffer 44. In other cases, the unpacking buffer 44 may simply unpack packed fragment blocks prior to providing them to the data path 48 for processing.

In order to minimize costs, the amount of additional logic included on the custom memory 40 aside from the memory array 46 may be minimized. This is due to the fact that in typical DRAM processing technology, the inclusion of additional circuitry on the integrated circuit that includes the DRAM is relatively expensive. Therefore, although some of the blending circuitry within the video graphics system has been moved onto the custom memory 40, some functions remain within the graphics processor 10 in order to keep the production costs of the custom memory 40 within a feasible range.

The data path 48 receives pixel fragments transmitted to the custom memory 40 by the custom memory interface 18. The data path performs first pass blending operations that include Z comparison operations using the pixel fragments. Preferably, as mentioned above, such first pass blending operations are performed on a block-by-block basis such that a plurality of pixel locations and their corresponding fragments are processed simultaneously.

The first pass blending operation for each pixel fragment blends the pixel fragment with the stored pixel data retrieved from the frame buffer within the memory array 46. As will be described below, the first pass blending may result in a determination that additional second pass blending operations need to take place within the graphics processor 10. This occurs when the blending operations performed by the data path 48 do not result in a sample set that can be represented as a compressed sample set, where a compressed sample set may vary from one implementation to the next.

When the first pass blending data produced through the first pass blending operation by the data path 48 can be compressed to a compressed sample set, the compressed sample set is stored back into the frame buffer within the memory array 46 at the appropriate pixel location. When block-by-block operations occur, a block of pixel data is read from the frame buffer from a specific block location, and after processing, a block of resultant pixel data is written back into the frame buffer at the same location, where various portions of the resultant pixel data block may or may not be modified by the first pass blending operations.

In one example embodiment, each compressed sample set includes a single color value, a single Z value, and a flag that indicates whether or not the information stored within the entry of the frame buffer is a compressed sample set. Thus, in such an embodiment, the full set of samples for the pixel must be compressible into a single color and Z value. This only occurs when all of the samples for the pixel have the same color value and the same Z value. Thus, if a single primitive completely overlaps a pixel, it can be described using a single color value and a single Z value. Any pixels that do not have this characteristic require a complete sample set stored within the sample memory 25 and pointer information stored within the frame buffer. Such a single sample compression technique is described in additional detail in a co-pending patent application Ser. No. 09/619,129 entitled "METHOD AND APPARATUS FOR VIDEO GRAPHICS ANTI-ALIASING USING A SINGLE SAMPLE FRAME BUFFER AND ASSOCIATED SAMPLE MEMORY", a filing date of Jul. 18, 2000.

In another example embodiment, each compressed sample set within the frame buffer includes a first color value, a first Z value, a second color value, a second Z value, and a mask. The first color value and the first Z value form a first color/Z pair, and the second color value and the second Z value form a second color/Z pair. The mask differentiates between which samples are covered by the first color/Z pair and the second color/Z pair. Thus, in an 8 times oversampling implementation, the mask will include 8 bits, where a 0 in a particular bit location may indicate that that particular sample is described using the first color/Z pair. In such an example embodiment, a 1 value in a bit location of the mask would indicate that the corresponding sample is covered by the second color/Z pair. Therefore, a pixel that is completely covered by a single color/Z pair can be indicated either by all 0's or all 1's within the mask. As such, one of these homogenous bit patterns is selected to indicate complete coverage and the other is used to indicate that the entry within the frame buffer stores pointer information rather than two color values and two Z values. Such a two-sample compression technique is described in additional detail in co-pending patent application entitled "METHOD AND APPARATUS FOR VIDEO GRAPHICS ANTI-ALIASING" which has a U.S. patent application Ser. No. 09/141,797, and which was filed on Aug. 28, 1998.

When the first pass blending data cannot be compressed to a compressed sample set, pointer information is stored within the appropriate pixel location in the frame buffer instead of a compressed sample set. The pointer information preferably includes a pointer value that corresponds to the location in the sample memory 25 at which the complete sample set for the pixel location is stored. Thus, when the sample set cannot be compressed to a compressed size for storage in the frame buffer, the complete sample set is stored within sample memory 25 at a particular location, and a pointer to this location is stored within the frame buffer such that the complete sample set can be retrieved for use in the future.

The pointer information stored within the frame buffer when compression cannot be achieved may also include a front-most Z value corresponding to the complete sample set. In other embodiments, a rear-most or other Z value representative of the sample set may be included in the pointer information stored within the frame buffer. Front- and rear-most Z values can enable some of the pixel fragments that are to be processed to be discarded based on the relative positioning of the fragments with regard to the pixel data currently stored within the frame buffer. For example, if the Z value for a pixel fragment is behind the rear-most Z value for a particular pixel location, the fragment can simply be discarded as it will not be visible due to the fact that it lies behind the data stored for that pixel location. In other cases, the front-most Z value can be useful in determining that a pixel fragment completely overlaps the currently stored pixel data for a pixel location such that the color and Z value for the pixel fragment are appropriate for all of the samples of the pixel following the blending operation.

In some cases, a new entry may have to be established within the sample memory 25 based on a first pass blending operation. Thus, if it is determined that a pixel location requires a complete sample set within the sample memory 25, and such a sample set does not already exist, a new pointer must be derived in order to store pointer information within the frame buffer such that the sample set can be referenced in the future. The pointer value may be retrieved from a pointer buffer 54 that stores released pointer values that have been sent over the bus 30 from the custom memory interface 18. The pointer buffer 54 may be of a relatively small size such that the pointer buffer 54 can only store a relatively small number of pointer values.

As the pointer values stored within the pointer buffer 54 are consumed through processing operations by the data path 48, the custom memory interface 18 may maintain an indication as to the fullness of the pointer buffer 54. When the number of forwarded released pointer locations falls below a threshold number, the custom memory interface can pop at least one released pointer location from a stack 26, which stores released pointer locations, and forward these released pointer locations to the pointer buffer 54 for subsequent use. Because the custom memory interface 18 receives an indication from the data path 48 when it has fetched a pointer location from the pointer buffer 54, and the custom memory interface 18 controls the ingress of pointer locations to the pointer buffer 54, the custom memory interface 18 can determine the current number of pointer locations stored within the pointer buffer 54.

A counter 52 may be also included within the custom memory 40. The counter 52 may store the next available pointer location, which can be fetched by the data path 48 for use. Thus, if the pointer buffer 54 is empty, or if the system does not reuse the released pointer locations, the next available pointer location can be fetched from the counter 52. Each time a next available pointer location is fetched for use by the data path 48, the counter 52 increments such that it subsequently points to the next available pointer location within the sample memory 25.

After performing the first pass blending operation, the data path 48 provides first pass blending results to the custom memory interface within the graphics processor. The first pass blending results may be packed using a packing block 53 such that the bandwidth available on the bus 32 is used efficiently. The packing performed by the packing block 53 may be similar to that performed by the packing block 28 such that only relevant data is sent back over the bus 32 and an overabundance of placeholders associated with the block transfer do not unnecessarily consume bus bandwidth.

The first pass blending results for each fragment indicate whether the results of the first pass blending operation were compressed to a compressed sample set and stored within the frame buffer in such a compressed format. The custom memory interface 18 forwards the first pass blending results to the sample memory controller 24. The sample memory controller 24 is operably coupled to the sample memory 25.

In some cases where second pass blending operations are required, the pixel fragment must be blended with a compressed sample set that had been stored in the frame buffer to produce a sample set that cannot be compressed back to a compressed sample set. In such cases, the first pass blending results include a pointer value and the compressed sample set with which the pixel fragment is to be blended. In an embodiment that includes a counter 52 and a pointer buffer 54 in the custom memory 40, such first pass blending information may also include an indication as to whether the pointer value was retrieved from the counter 52 or the pointer buffer 54. The sample memory controller 24 then blends the pixel fragment, which it retrieves from the buffer 20, with the compressed sample set, which was sent over as a part of the first pass blending results, to produce a complete sample set that is stored at the location indicated by the pointer. By storing the pixel fragments 16 within the buffer 20, they do not need to be sent back across the bus 32 from the custom memory 40 when second pass blending operations are required. As such, the bus 32 is not unnecessarily utilized, thus enabling the system to be designed with lower bandwidth requirements on the bus 32.

In some cases, a sample set for the pixel location may already be stored within the sample memory, and the pixel fragment must be blended with this already existing sample set. The sample set is retrieved based on the pointer location sent back as a part of the first pass blending results. The sample memory controller 24 retrieves the pixel fragment to which the first pass blending results correspond from the buffer 20 and blends it with the sample set retrieved from the sample memory. The resultant sample set generated by such a second pass blending operation are stored back to the sample memory 25 based on the pointer location included in the first pass blending result received from the custom memory 40.

In some cases, the blending of a pixel fragment results in the sample set for a pixel location changing such that it can be compressed when it could not be compressed before the fragment was blended with the stored data. In such cases, the sample set stored within the sample memory 25 is no longer valid as a compressed sample set stored within the frame buffer completely describing the pixel. As such, the location at which the sample set is stored is released for subsequent use for storage of a different sample set. These pointer locations are sent back across the bus 32 as a part of the first pass blending results, and the released locations are accumulated within the stack 26 prior to forwarding to the pointer buffer 54.

In the case where the first pass blending results indicate that the second pass blending operations are not required, the sample memory controller 24 removes the pixel fragment to which the first pass blending results correspond from the buffer 20. As such, the buffer 20 is continuously being filled and emptied. In one embodiment, the buffer 20 is a first-in-first-out (FIFO) buffer where pixel fragments are pushed into the buffer 20 by the pixel pipe 14 and pulled out by the sample memory controller 24.

Each sample set stored within the sample memory 25 preferably includes the same number of samples. In one embodiment, each pixel location is described using eight samples, which corresponds to eight times oversampling. In other embodiments, a greater or lesser number of samples may be used to describe each pixel within the display frame. As is apparent to one of ordinary skill in the art, a tradeoff exits between the number of samples maintained for each pixel location and the degree of accuracy with which the image included in the display frame is maintained.

Figure 2:
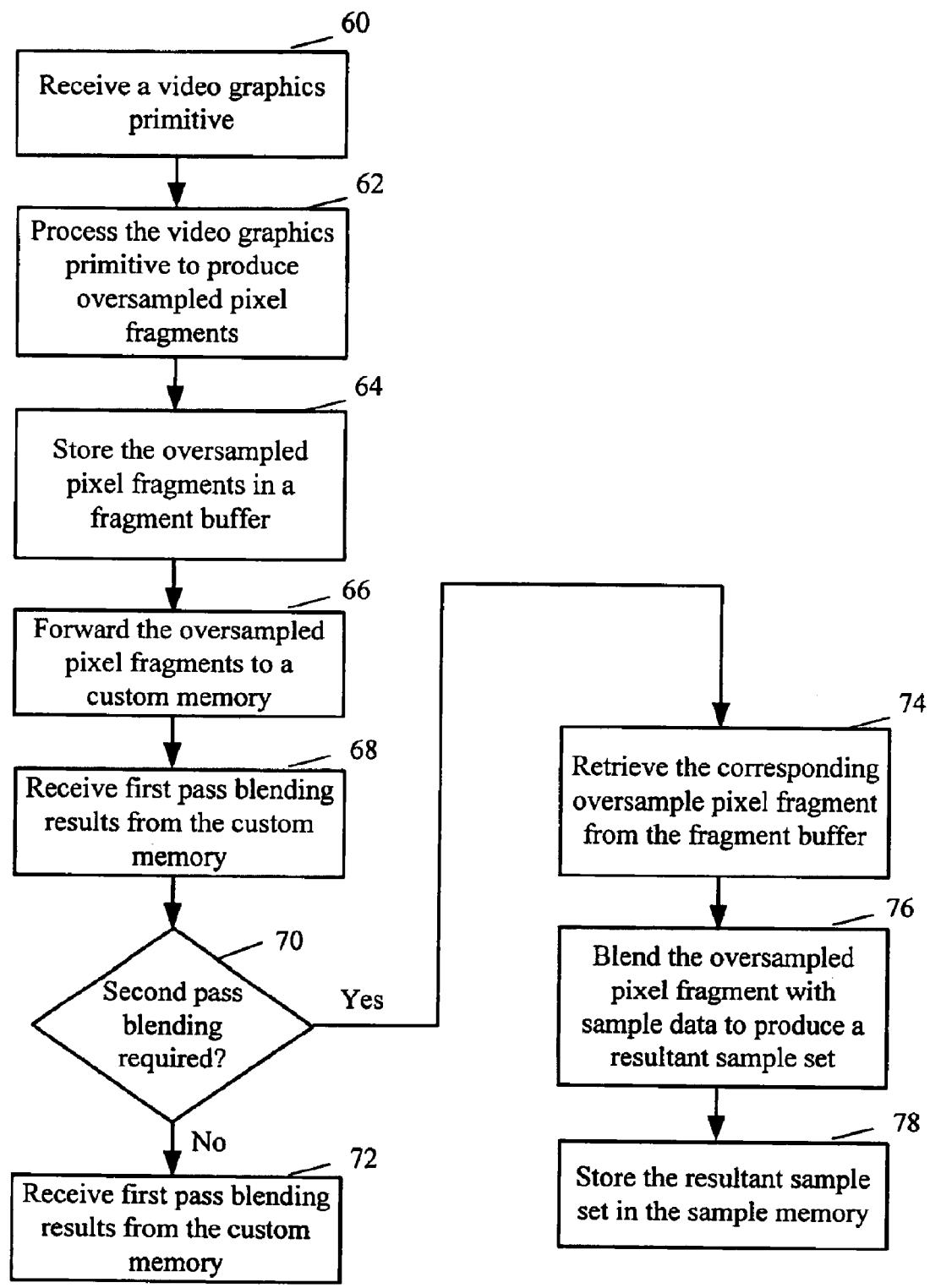
FIG. 2 illustrates a flow diagram of a method for oversampled video graphics processing in accordance with a particular embodiment of the present invention.

FIG. 2 illustrates a flow diagram of a method for oversampled graphics processing. The method illustrated in FIG. 2 may correspond to the various operations performed by the graphics processor 10 included in FIG. 1. The method of FIG. 2 begins at step 60 where a video graphics primitive is received. At step 62, the video graphics primitive is processed to produce over sampled pixel fragments. As described above, the processing performed may be that commonly performed within 3-D graphics pipelines. Each oversampled pixel fragment includes a color value, a Z value, and a coverage mask that indicates to which of the samples the color and the Z values correspond.

At step 64, the oversampled pixel fragments generated through processing the video graphics primitive are stored in a fragment buffer. The fragment buffer may be a buffer such as the buffer 20 described in FIG. 1 above. The fragment buffer may be a FIFO buffer such that fragments are withdrawn from the fragment buffer in the order in which they were inserted into the fragment buffer.

At step 66, the oversampled pixel fragments generated from the video graphics primitive are forwarded to a custom memory that performs first pass blending operations. In response to forwarding the oversampled pixel fragments to the custom memory, the graphics processor receives first passed blending results from the custom memory at step 68. First pass blending results indicate whether or not second pass blending is required for each oversampled pixel fragment. If no second pass blending is required, the pixel information for the pixel to which the fragment corresponds can be completely described using a compressed sample set that is stored within the frame buffer. As such, no entry is required within the sample memory for that particular pixel location.

If it is determined at step 70 that second pass blending is not required based on the first pass blending results received at step 68, the method proceeds to step 72. At step 72, the oversampled pixel fragment corresponding to the first pass blending results is removed from the fragment buffer. Thus, the oversampled pixel fragment is not required for further processing, and therefore can be removed from the buffer such that the space within the buffer is available for subsequently generated fragments. If the first pass blending results include a pointer that has now been released, such a pointer is pushed onto a stack for future use.

If it is determined at step 70 that second pass blending operations are required based on the first pass blending results, the method proceeds to step 74. At step 74, the corresponding oversampled pixel fragment is retrieved from the fragment buffer for use in the second pass blending operations. Retrieval of the oversampled pixel fragment from the fragment buffer removes the oversampled pixel fragment from the fragment buffer such that the space is available for subsequently generated oversampled pixel fragments.

At step 76, the oversampled pixel fragment that has been retrieved is blended with sample data to produce a resultant sample set. The blending operations that occur at step 76 may include the retrieval of a current sample set for the appropriate pixel location based on a pointer value that accompanies the first pass blending results. Thus, the particular pixel to which the pixel fragment corresponds may already be described using a complete sample set within the sample memory. As such, this complete sample set must be retrieved in order to perform blending operations to produce the resultant sample set which is to be stored back into the sample memory based on the pointer.

In other cases, there may not currently be a complete sample set stored within the sample memory for the particular pixel location to which the fragment corresponds. As such, the first pass blending results passed from the custom memory to the graphics processor include a pointer value as well as at least a portion of the compressed sample set that was stored for the pixel location within the frame buffer prior to first pass blending of the pixel fragment. Thus, the first pass blending resulted in pointer information being stored within the frame buffer for the pixel location, and the second pass blending operation blends the pixel fragment with the sampled data as described by the compressed sample set provided by the custom memory.

In one example, the compressed sample sets stored within the frame buffer may only include a single color and a single Z value. If a subsequently received fragment only has partial coverage of the pixel and lies in front of the current pixel data stored within the frame buffer, the result of blending this fragment with the current pixel data produces samples for that pixel location that correspond to the color and Z value of the fragment as well as the color and Z value of the pixel data previously stored within the frame buffer. As such, a pointer is stored within the frame buffer, and a complete sample set is created within the sample memory at the pointer location based on the fragment and the compressed sample set that had been stored for that pixel location.

At step 78, the resultant sample set produced through the second pass blending operation is stored in the sample memory at a location corresponding to the pointer provided as a part of the first pass blending results. Note that when new sample sets must be created within the sample memory, pointer values must be generated by the custom memory. This may be accomplished by providing a pointer buffer within the custom memory, where released locations are forwarded to the pointer buffer by the graphics processor when it is determined that the contents of the pointer buffer reach a low threshold. A stack within the graphics processor may be used to store released pointers prior to forwarding them to the pointer buffer within the custom memory. This was described above with respect to FIG. 1. Released pointers are pushed onto the stack when first pass blending results indicate that second pass blending is not required and a released pointer is included in the first pass blending results. Thus, when a pointer value that had been stored within the frame buffer is no longer required (a compressed sample set now resides within the frame buffer for that pixel location), the released pointer is included in first pass blending results passed to the graphics processor such that the released pointer can be pushed onto the stack for subsequent use.

Figure 3:
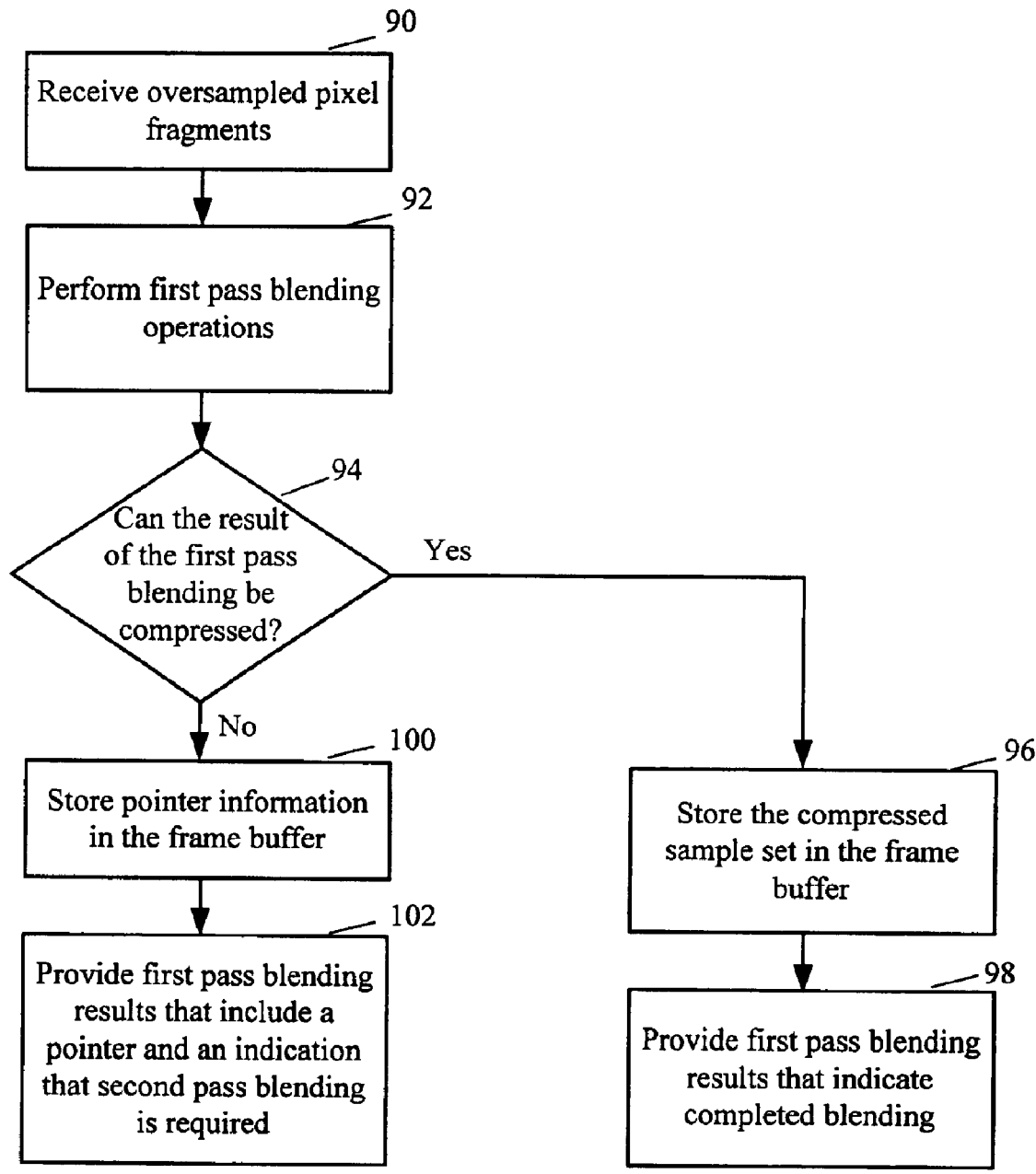
FIG. 3 illustrates a flow diagram of a method for blending oversampled pixel fragments in a custom memory in accordance with a particular embodiment of the present invention.

FIG. 3 illustrates a flow diagram of a method for blending oversampled fragments within a custom memory. The method begins at step 90 where oversampled pixel fragments are received. In some embodiments, the oversampled pixel fragments may be received in a packed format, where unpacking of the oversampled pixel fragments is required. Such unpacking may include formatting the oversampled pixel fragments into blocks such that block-by-block blending can be performed within the custom memory. Such unpacking may include buffering operations such that the speed with which blocks are transferred over the bus to the custom memory can be controlled to ensure that buffer overflow does not occur.

Each oversampled pixel fragment includes a color value, a Z value, and a coverage mask. The coverage mask indicates to which samples of the oversampled pixel fragment the color and Z values correspond. When the coverage mask indicates that the color and Z values correspond to all of the samples of the oversampled pixel fragment, the pixel fragment has complete coverage.

At step 92, first pass blending is performed for each pixel fragment. First pass blending operations utilize pixel data stored in a frame buffer within the custom memory. First blending operations fetch the pixel data from the frame buffer and determine based on the pixel data stored in the frame buffer and the particular oversampled pixel fragment corresponding to that particular pixel location whether or not second pass blending operations must be performed. The determination as to whether second pass blending operations need to be performed is based on whether or not the results of the first pass blending operation can be compressed to a resultant compressed sample set. Determination as to whether or not the results of the first pass blending operation can be compressed is based on the type of compression used for storing the sample set within the frame buffer. In some cases, single sample compression is used, where if a sample set cannot be compressed to a single color value and a single Z value, pointer information is stored within the frame buffer. In other embodiments, multiple sample compression is used. In a two-sample compression technique, the compressed sample set includes two color values, two Z values, and a mask that indicates the coverage of each color/Z pair.

The specific cases where compression and non-compression is possible for a pixel fragment in an oversampled system is described in additional detail for a specific type of compression with respect to FIG. 6 below. Such a specific example uses single sample compression, where compressed sample sets only include a single color value, a single Z value, and a flag that indicates whether a compression sample set is stored within the frame buffer for the pixel location or if pointer information is stored for that pixel location.

Figure 4:
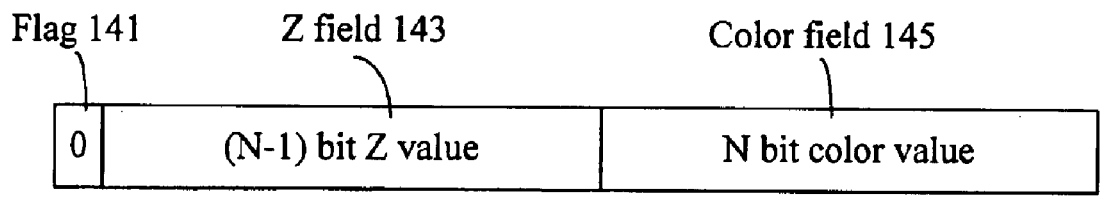
FIGS. 4 and 5 provide graphical representations of frame buffer entries corresponding to the oversampling techniques described in accordance with a particular embodiment of the present invention.

At step 94, it is determined whether or not the results of the first pass blending can be compressed into a compressed sample set for storage within the frame buffer. For an example embodiment where a compressed sample set includes a single color value and a single Z value, FIG. 4 illustrates an example frame buffer entry 140. The frame buffer entry 140 includes a color field 145, a Z field 143, and a flag 141. The color field 145 stores an N-bit color value, and the Z field 143 stores and N-1 bit Z value. The flag 141 is a single bit flag that indicates that the frame buffer entry 140 stores valid color and Z data. Note that in other embodiments, the distribution of bits within the frame buffer entry 140 may vary, and other values may be included within the frame buffer entry 140 such as stencil values and the like.

Figure 5:
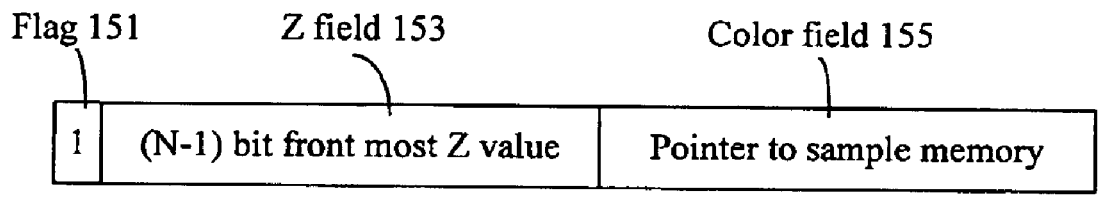

FIG. 5 illustrates an example frame buffer entry 150 that stores pointer information rather than a compressed sample set. The frame buffer entry 150 includes a color field 155 that stores a pointer to a specific location within the sample memory, rather than storing color information as was the case in the frame buffer entry 140. The Z field 153 stores a front-most Z value corresponding to the samples included in the sample set stored within the sample memory. The flag 151 provides an indication that the frame buffer entry 150 stores pointer information rather than a compressed sample set.

Returning to FIG. 3, if it is determined at step 94 that the result of the first pass blending operations can be compressed into a compressed sample set, the method proceeds to step 96. At step 96, the compressed sample set is stored within the frame buffer at the location to which the pixel fragment corresponds. At step 98, first pass blending results are provided to the graphics processor, and the first pass blending results indicate that the pass blending operations completed all of the blending required for the particular pixel fragment. Note that the first pass blending results may also include a released pointer value if the frame buffer formerly stored pointer information and now stores a compressed sample set.

If it is determined at step 94 that the results of the first pass blending operation cannot be compressed into a compressed sample set for storage in the frame buffer, the method proceeds to step 100. At step 100, pointer information is stored in the frame buffer at the appropriate pixel location. The pointer information preferably includes a pointer that points to the complete sample set as it will be stored within the sample memory once the graphics processor has completed the second pass blending operations. The pointer included in the pointer information may be retrieved from a pointer buffer within the custom memory, or from a counter that indicates the next available pointer location within the sample memory.

The pointer information may also include a front-most Z value such that subsequent blending operations corresponding to this pixel location may be simplified. The front-most Z value, or another representative Z value such as the rear-most Z value, that is stored within the frame buffer may be the Z value for the oversampled pixel fragment which is blended during the first pass blending operations.

At step 102, the first pass blending operation results are provided to the graphics processor, where the first pass blending results include the pointer that is included in the pointer information stored in the frame buffer. As such, the pointer can be used by the graphics processor to store the complete sample set for the pixel location at the appropriate address within the sample memory. The first pass blending results provided at step 102 also include an indication that second pass blending operations are required. In some cases, the indication that second pass blending operations are required may be accompanied by a compressed sample set (or portion thereof) that was stored for that pixel location within the frame buffer such that this compressed sample set can be utilized in the second pass blending operations. In other cases, the sample data corresponding to the pixel location may already be stored within the sample memory such that retrieval of the sample data is required for the second pass blending operations. In such cases, a compressed sample set does not accompany the indication that second pass blending operations are required.

Figure 6:
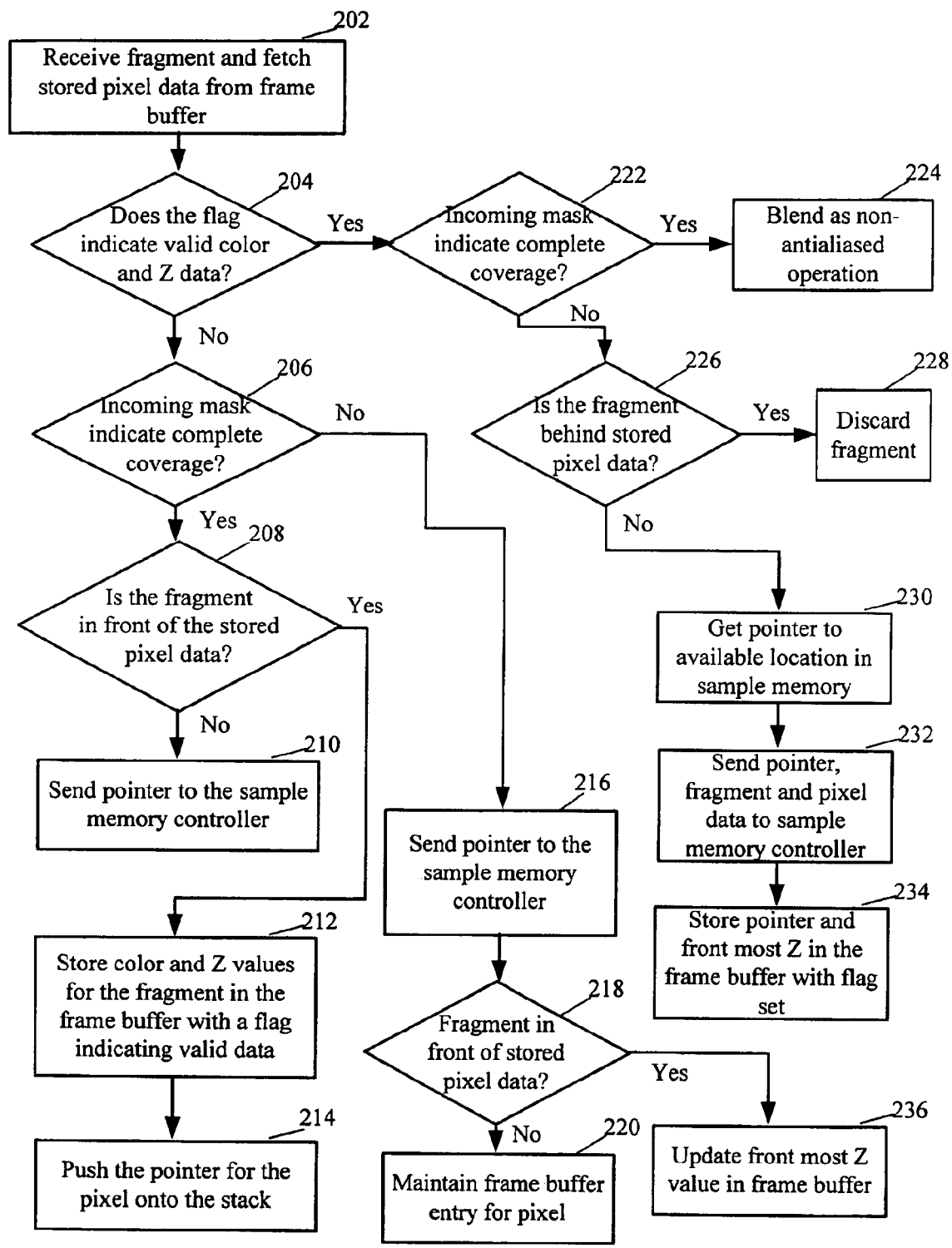
FIG. 6 illustrates a flow diagram of a method for performing first pass blending operations within a custom memory in accordance with a particular embodiment of the present invention.

FIG. 6 illustrates a flow diagram that corresponds to an example set of steps that may be performed as a part of the first pass blending operations within a particular example system. The example system to which the flow diagram of FIG. 6 corresponds is a system that utilizes single sample compression, where each press sample set only includes a single Z value and a single color value.

The method begins at step 202 where a fragment is received. The fragment includes a color, a Z value, and a coverage mask that indicates which samples for the pixel the fragment covers. The fragment also includes pixel coordinate information that indicates to which pixel of the display the fragment corresponds. Based on this coordinate data, the stored pixel data for that pixel location is retrieved from the frame buffer.

The stored pixel data for each pixel location includes a flag. The flag indicates whether the stored pixel data represents valid color and Z data or pointer information. At step 204, it is determined if the flag indicates that valid color and Z data have been retrieved from the frame buffer. If the flag indicates that valid color and Z data have not been fetched, and therefore pointer information has been retrieved, the method proceeds to step 206. In some embodiments, the color data and Z data portions of the stored pixel data may be stored in separate memory structures. In such embodiments, a flag may be included with the color data as it is stored as well as with the Z data as it is stored. As such, only one of the two memory structures would have to be accessed in order to determine whether or not valid color and Z data is present in the frame buffer.

At step 206, the mask included in the fragment data received is examined to determine if the fragment has complete pixel coverage. In other words, it is determined if the color and Z values for the fragment correspond to all of the samples for the pixel. In one embodiment, this may be indicated by the mask containing all 1's. If the fragment has complete coverage, the method proceeds to step 208.

At step 208, it is determined if the fragment is in front of the stored pixel information. This determination can be made if the front-most Z value for the complete set of samples corresponding to the pixel location is stored with the stored pixel data in the frame buffer. This front-most Z value can be compared with the Z value of the fragment, and if the fragment Z value is in front of the front-most Z value, the fragment, which has complete coverage of the pixel, completely covers the stored pixel data and renders it moot. If such is the case, the method proceeds to step 212. At step 212, the color and Z values for the pixel fragment are stored in the frame buffer along with a flag that indicates the values in the pixel location represent color and Z data as opposed to pointer information. Thus, the first pass blending operation has completed all of the blending required for the fragment. An indication as to this is sent back to the graphics processor such that the fragment can be removed from the buffer included in the graphics processor.

If it is determined at step 208 that the fragment does not lie in front of the front-most sample of the stored pixel data for the pixel, the method proceeds to step 210. At step 210, the pointer to the full set of samples stored for the pixel is sent to the sample memory controller. The sample memory controller can then blend the fragment (which it retrieves from the buffer on the graphics processor) with the stored samples in the sample memory on a sample-by-sample basis and store the results at the location corresponding to the pointer. The information in the frame buffer is not updated, as the samples for the pixel are still in the same location and the front-most Z value has not been changed as a result of blending the fragment.

If it is determined at step 206 that the fragment received does not have complete coverage, the method proceeds to step 216. At step 216 the pointer to the full set of samples stored for the pixel is sent to the sample memory controller. The sample memory controller can then blend the fragment (retrieved from the buffer on the graphics processor) with the stored samples in the sample memory on a sample-by-sample basis and store the results at the location corresponding to the pointer. The method then proceeds to step 218 at which it is determined whether or not the fragment is positioned in front of the stored pixel data. This can be determined by comparing the Z value for the fragment with the front-most Z value for the full set of samples, where the front-most Z value is stored in the frame buffer.

If it is determined that the fragment does lie in front of the stored pixel information, the method proceeds to step 236 where the front-most Z value stored in the frame buffer is updated to reflect the new front-most Z value for the sample set stored in the sample memory. The new front-most Z value is the Z value of the fragment. If it is determined at step 218 that the fragment is not in front of all of the stored samples for the pixel, the method proceeds to step 220. At step 220, the frame buffer entry is left unchanged as the front-most Z value for the sample set is not modified as a result of blending the fragment with the stored set of samples.

Returning to step 204, if it is determined that the flag indicates that valid color and Z data are stored in the frame buffer for the pixel (the sample set for that pixel could be compressed to a single color and Z value pair), the method proceeds to step 222. At step 222, it is determined if the incoming mask included in the fragment indicates that the fragment completely covers the pixel. If so, the method proceeds to step 224 and the fragment and stored color/Z pair are blended as they would be in a non-antialiased system. In other words, the Z value stored in the frame buffer is compared with the Z value of the fragment. If the Z value of the fragment indicates it lies in front of the stored pixel data, the color and Z values for the fragment replace the color and Z values currently stored in the frame buffer. If the fragment lies behind the stored pixel data, the fragment is discarded. An indication that the first pass blending operation completely blended the fragment is then provided to the graphics processor.

If it is determined at step 222 that the fragment does not have complete pixel coverage, the method proceeds to step 226. At step 226, it is determined if the fragment is behind the stored pixel data. This is accomplished by comparing the Z value in the frame buffer with the Z value for the fragment. Because the Z value in the frame buffer represents the Z value for all of the samples for the pixel, if the fragment Z is behind the stored Z, the fragment is completely covered by the stored samples and therefore moot. As such, the fragment is discarded at step 228. Once again, an indication that the first pass blending operation completely blended the fragment is then provided to the graphics processor.

If it determined at step 226 that the fragment is not behind the stored pixel data, the method proceeds to step 230. If the fragment is not behind the stored pixel data, the resultant pixel data resulting from the blending of the fragment with the stored pixel data is going to include samples from both the fragment and samples corresponding to the current Z and color values stored. As such, the resultant data cannot be compressed to a single color/Z pair and the full set of samples will be stored in the sample memory.

At step 230, a pointer to the next available location in the sample memory is obtained. This may be done by retrieving the pointer from a buffer or a stack, or by retrieving the next available location from a counter. At step 232, the pointer, the fragment and at least a portion of the pixel data stored in the frame buffer are sent to the sample memory controller for second pass blending operations. The sample memory controller can then blend the fragment and the stored pixel data to produce a sample set that is stored at the location corresponding to the pointer. At step 234, the pointer and the front-most Z value (either the fragment Z or the stored Z) is stored in the frame buffer along with a flag that indicates the presence of pointer information rather than a single color/Z pair.

The present invention provides a method and apparatus for performing video graphics anti-aliasing in a system that utilizes a custom memory. The custom memory includes a memory array, which may be a DRAM memory array, that stores the frame buffer for the system. Also included within the custom memory is a portion of the blending circuitry used to blend newly generated pixel fragments with stored pixel data. In cases where the blending performed within the DRAM results in data that can be reduced to a compressed sample set, further blending operations are not required. However, if the results of the first pass blending cannot be compressed, the appropriate information is provided back to the graphics processor such that the complete sample set for the particular pixel location can be stored within a sample memory for subsequent use. As such, the present invention provides a lossless compression technique that supports an over-sampled video graphics-processing environment. Such oversampling can help reduce undesirable aberrations within displayed images.

It should be understood that the implementation of other variations and modifications of the invention in its various aspects will be apparent to those of ordinary skill in the art, and that the invention is not limited by the specific embodiments described. For example, methods of compressing the sample set for a pixel may be used which result in some loss of information, where the loss is understood and tolerated by the system. It is therefore contemplated to cover by the present invention, any and all modifications, variations, or equivalents that fall within the spirit and scope of the basic underlying principles disclosed and claimed herein.

What is claimed is:

1. A graphics processing system that performs oversampling anti-aliasing, comprising:
    a sample memory that stores a plurality of samples for each pixel location of at least a portion of a plurality of pixel locations of a display frame;
    a graphics processor operably coupled to the sample memory, wherein the graphics processor includes:
    a pixel pipe that receives video graphics primitives and performs three-dimensional processing of the video graphics primitives to produce pixel fragments, wherein each pixel fragment includes a color value, a Z value, and a mask;
    a first buffer operably coupled to the pixel pipe, wherein the first buffer stores the pixel fragments produced by the pixel pipe;
    a custom memory interface operably coupled to the pixel pipe, wherein the custom memory interface transmits the pixel fragments, wherein the custom memory interface receives first pass blending results; and
    a sample memory controller operably coupled to the sample memory, the custom memory interface, and the first buffer, wherein when the first pass blending results for a pixel fragment indicate that second pass blending is required, the sample memory controller retrieves the pixel fragment from the first buffer and performs the second pass blending for the pixel fragment, wherein the second pass blending stores a sample set for a corresponding pixel location in the sample memory at a pointer location.

2. The graphics processing system of claim 1 further comprises: a custom memory operably coupled to the graphics processor, wherein the custom memory includes:
    a memory array that includes a frame buffer that stores pixel data, wherein the frame buffer includes an entry for each pixel location of the plurality of pixel locations of the display frame, wherein each entry of the frame buffer stores one of a compressed sample set and a set of pointer information; and
    a data path operably coupled to the memory array, wherein the data path receives the pixel fragments transmitted by the custom memory interface, wherein the data path performs first pass blending operations that include Z comparison operations, wherein a first pass blending operation for each pixel fragment blends the pixel fragment with stored pixel data retrieved from the frame buffer to produce first pass blending data,
    wherein when the first pass blending data can be compressed to a compressed sample set, the compressed sample set is stored in the frame buffer, wherein when the first pass blending data cannot be compressed to a compressed ample set, pointer information is stored in the frame buffer, wherein the data path provides the first pass blending results to the custom memory interface of the graphics processor, wherein the first path blending results indicate whether the first pass blending data can be compressed to a compressed sample set.

3. The graphics processing system of claim 2, wherein the graphics processor is a first integrated circuit and wherein the custom memory is a second integrated circuit.

4. The graphics processing system of claim 2, wherein the memory array is a dynamic random access memory (DRAM) array.

5. The graphics processing system of claim 2, wherein the pointer location at which the sample memory stores the sample set is included in the first pass blending results.

6. The graphics processing system of claim 5, wherein the custom memory includes a second buffer operably coupled to the data path, wherein the second buffer stores forwarded released pointer locations, wherein the pointer location is fetched by the data path from the second buffer.

7. The graphics processing system of claim 6, wherein the graphics processor includes a stack operably coupled to the custom memory interface, wherein the stack stores released pointer locations, wherein the custom memory interface monitors a number of forwarded released pointer locations in the second buffer of the custom memory, wherein when the custom memory interface determines that the number of forwarded released pointer locations is below a threshold number, the custom memory interface pops at least one released pointer location from the stack and forwards it to the second buffer.

8. The graphics processing system of claim 5, wherein the custom memory includes a counter operably coupled to the data path, wherein the counter indicates a next available pointer location, wherein the next available pointer location is fetched by the data path and included in the first pass blending results as the pointer location.

9. The graphics processing system of claim 2, wherein the custom memory interface includes a first packing block wherein the first packing block pack; pixel fragments transmitted from the graphics processor to the custom memory.

10. The graphics processing system of claim 9, wherein the custom memory includes an unpacking buffer operably coupled to the first packing block, wherein the unpacking buffer unpacks packed pixel fragments received from the first packing block and buffers unpacked fragments prior to processing by the data path.

11. The graphics processing system of claim 2, wherein the custom memory includes a second packing block operably coupled to the data path, wherein the second packing block packs first pass blending results prior to transmission to the custom memory interface of the graphics processor.

12. The graphics processing system of claim 2, wherein each compressed sample set includes a color value, a Z value, and a flag bit.

13. The graphics processing system of claim 2, wherein each compressed sample set includes a first color value, a first Z value, a second color value, a second Z value, and a mask that indicates to which samples each of the first and second color and Z values correspond for a corresponding pixel.

14. The graphics processing system of claim 2, wherein the pointer information stored in the frame buffer by the data path includes the pointer location at which the sample set for the corresponding pixel location is stored in the sample memory.

15. The graphics processing system of claim 14, wherein the pointer information stored in the frame buffer further includes a front-most Z value included in the sample set for the corresponding pixel location.

16. The graphics processing system of claim 2, wherein the custom memory interface transmits the pixel fragments to the custom memory using a first bus, and wherein the data path provides the first path blending results to the custom memory interface using a second bus.

17. The graphics processing system of claim 1, wherein each sample set in the sample memory includes at least eight samples.

18. A method for oversampled graphics processing comprising:

receiving video graphics primitives; processing the video graphics primitives to produce oversampled pixel fragments, wherein each oversampled pixel fragment includes a color value, a Z value, and a coverage mask;

storing the oversampled pixel fragments in a fragment buffer, forwarding the oversampled pixel fragments to a custom memory for first pass blending;

receiving first pass blending results from the custom memory;

when the first pass blending results for an oversampled pixel fragment indicate that second pass blending is required for the oversampled pixel fragment:

retrieving the oversampled pixel fragment from the fragment buffer, wherein retrieving removes the corresponding oversampled pixel fragment from the fragment buffer;

blending the oversampled pixel fragment with sample data for a pixel location to which the oversampled pixel fragment corresponds to produce a resultant sample set; and storing the resultant sample set in the sample memory based on a pointer included in the first pass blending results; and when the first pass blending results indicate that second pass blending is not required, removing the corresponding oversampled pixel fragment from the fragment butter.

19. The method of claim 18, wherein blending the oversampled pixel fragment further comprises:

when the sample data for the pixel location is not included in the first pass blending results, fetching the sample data from a sample memory using the pointer included in the first pass blending results.

20. The method of claim 18 further comprises:

when the first pass blending results indicate that second pass blending is not required and a released pointer is included in the first pass blending results, pushing the released pointer onto a stack.

21. The method of claim 20 further comprises: monitoring contents of a pointer buffer included on the custom memory; and when the contents of the pointer buffer reach a low threshold, popping at least one released pointer off the stack and forwarding the at least one released pointer to the pointer buffer.

22. A method for blending oversampled fragments in a custom memory, comprising:

receiving oversampled pixel fragments, wherein each oversampled pixel fragment includes a color value, a Z value, and a coverage mask, wherein the coverage mask indicates to which samples of the oversampled pixel fragment the color and Z values correspond, wherein when the coverage mask indicates the color and Z values correspond to all of the samples of the oversampled pixel fragment, the pixel fragment has complete coverage; and for each oversampled pixel fragment, performing a first pass blending operation with pixel data stored in a frame buffer, wherein the pixel data stored for each pixel location is one of a compressed sample set and a set of pointer information, wherein performing the first pass blending operation includes:

determining if a result of the first pass blending operation can be compressed to a resultant compressed sample set when the result of the first pass blending operation can be compressed to the resultant compressed sample set, storing the resultant compressed sample set is stored in the frame buffer; and generating first pass blending results, wherein the first pass blending results indicate whether a second pass blending operation is to be performed by a sample memory controller, wherein when the result of the first pass blending operation cannot be compressed, the fist pass blending results indicate that the second pass blending operation is to be performed.

23. The method of claim 22, wherein performing the first pass blending operation further comprises:

when the pixel data stored in the frame buffer is a compressed sample set and the oversampled pixel fragment has complete coverage:

blending the compressed sample set and the oversampled pixel fragment to produce blended pixel data as the first pass blending results;

storing the blended pixel data in the frame buffer; and generating first pass blending results that indicate that the oversampled pixel fragment has been fully blended.

24. The method of claim 22, wherein performing the first pass blending operation further comprises:

when the pixel data is a compressed sample set and the oversampled pixel agent does not have complete coverage:

if the Z value for the oversampled pixel fragment is behind a representative Z value for the compressed sample set:

discarding the oversampled pixel fragment; and generating first pass blending results that indicate that the oversampled pixel fragment has been fully blended;

if the Z value for the oversampled pixel fragment is not behind the representative Z value for the compressed sample set:

generating a pointer value;

storing the pointer value in the frame buffer, and generating first pass blending results that indicate that the second pass blending operation is to be performance, wherein the first pass blending results include the pointer value and at least a portion of the compressed sample set.

25. The method of claim 24, wherein generating the pointer value further comprises at least one of fetching the pointer value from a buffer and reading the pointer value from a counter.

26. The method of claim 24, wherein storing the pointer value in the frame buffer further comprises storing the pointer value and a new representative Z value in the frame buffer, wherein the new representative Z value is the Z value for the oversampled pixel fragment.

27. The method of claim 22, wherein performing the first pass blending operation further comprises:

when the pixel data is a set of pointer information and the oversampled pixel fragment has complete coverage:

if the Z value of the oversampled pixel fragment is in front of a representative Z value included in the set of pointer information:

generating a new compressed sample set based on the oversampled pixel fragment; storing the new compressed sample set in the frame buffer; and generating fist pass blending results that indicate a pointer value included in the set of pointer information is released; and if the Z value of the oversampled pixel fragment is not in front of a representative Z value included in the set of pointer information:

generating first pass blending results that indicate that the second pass blending operation is to be performed, wherein the first pass blending results include the pointer value included in the set of pointer information.

28. The method of claim 22, wherein performing the first pass blending operation further comprises:

when the pixel data is a set of pointer information and the oversampled pixel fragment does not have complete coverage, generating first pass blending results that indicate that the second pass blending operation is to be performed, wherein the first pass blending results include a pointer value included in the set of pointer information.

29. The method of claim 22, wherein each compressed sample set includes a color value, a Z value, and a flag.

30. The method of claim 22, wherein each compressed sample set includes a first color value, a first Z value, a second color value, a second Z value, and a mask.

31. The method of claim 22, wherein the custom memory includes a dynamic random access memory (DRAM) array that stores the frame buffer.

32. The graphics processing system of claim 2, wherein the data path simultaneously receives a plurality of pixel fragments transmitted by the custom memory interface.

33. The graphics processing system of claim 2, wherein the data path simultaneously receives the plurality of pixel fragments transmitted by the custom memory interface and wherein the first pass blending operation for each pixel fragment simultaneously blends the plurality of pixel fragments with corresponding stored pixel data retrieved from the frame buffer to produce the first pass blending data.

34. The method of claim 18, further including simultaneously retrieving a plurality of oversampled pixel fragments.

35. The method of claim 18, including:

simultaneously retrieving a plurality of oversampled pixel fragments; and simultaneously blending the oversampled pixel fragment with the plurality of sample data for corresponding pixel locations to which the oversampled pixel fragment corresponds, to produce the resultant sample set.

* * * * *